US011539736B1

United States Patent
Lin

(10) Patent No.: US 11,539,736 B1
(45) Date of Patent: *Dec. 27, 2022

(54) NETWORK ASSET CORRELATOR FOR CYBERSECURITY OPERATIONS

(71) Applicant: Rapid7, Inc., Boston, MA (US)

(72) Inventor: Wah-Kwan Lin, Melrose, MA (US)

(73) Assignee: Rapid7, Inc., Boston, MA (US)

( * ) Notice: Subject to any disclaimer, the term of this patent is extended or adjusted under 35 U.S.C. 154(b) by 309 days.

This patent is subject to a terminal disclaimer.

(21) Appl. No.: 17/075,857

(22) Filed: Oct. 21, 2020

Related U.S. Application Data

(63) Continuation of application No. 16/149,240, filed on Oct. 2, 2018, now Pat. No. 10,848,516.

(51) Int. Cl.
*H04L 9/40* (2022.01)
(52) U.S. Cl.
CPC .......... *H04L 63/1433* (2013.01); *H04L 63/20* (2013.01)
(58) Field of Classification Search
CPC ............................ H04L 63/1433; H04L 63/20
See application file for complete search history.

(56) References Cited

U.S. PATENT DOCUMENTS

| 9,280,667 | B1 | 3/2016 | Keanini et al. |
| 10,848,516 | B2 * | 11/2020 | Lin .................. H04L 63/1433 |
| 2006/0064619 | A1 | 3/2006 | Wen et al. |
| 2009/0299990 | A1 | 12/2009 | Setlur et al. |

OTHER PUBLICATIONS

Adam Halbardier, David Waltermire, Mark Johnson, Specification for the Asset Reporting Format 1.1, Jun. 2011, National Institute of Standards and Technology, U.S. Department of Commerce, entire document

* cited by examiner

*Primary Examiner* — Oleg Korsak
(74) *Attorney, Agent, or Firm* — Ashwin Anand

(57) ABSTRACT

Disclosed herein are methods, systems, and processes for utilizing computing entity resolution for network asset correlation. A scanned dataset that includes newly scanned node information that identifies newly scanned nodes on a network is received from a security server. The newly scanned node information is extracted from the scanned dataset and indicates that the newly scanned nodes cannot be identified as being part of existing computing devices in the network. The newly scanned node information is processed with a network asset correlator and the processing results in a set of asset correlation results for the newly scanned nodes. An existing computing device is identified based on a highest disparate correlation probability in the set of asset correlation results and the security server is instructed to perform a security action on the identified existing computing device.

18 Claims, 11 Drawing Sheets

Network Asset Correlation Table 505

| New Node Field 510 | Host Name Field 515 | IP Address Field 520 | MAC Address Field 525 | Operating System Field 530 | Operating Profile Field 535 | Asset Correlation Field 545 | | Resolution Threshold Field 550 | Entity Resolution Field 555 |
|---|---|---|---|---|---|---|---|---|---|
| X | Rapid7.X | 100.101.0.1 | 08-00-27-72-86-BB | Win10 | Gold | Existing Node A<br>Existing Node B<br>Existing Node C | 25%<br>65%<br>10% | 60% | To B |
| Y | Rapid7.Y | 101.196.62.3 | 00-E0-23-45-12-21 | MacOS | Silver | Existing Node A<br>Existing Node C<br>Existing Node E | 1%<br>4%<br>95% | 75% | To E |
| Z | Rapid7.Z | 192.168.0.1 | 00-10-5A-44-12-B5 | Linux | Bronze | Existing Node C<br>Existing Node E<br>Existing Node F | 30%<br>30%<br>40% | 85% | - |
| M | Rapid7.M | 108.102.105.7 | 00-1B-63-84-45-E6 | Win7 | Platinum | Existing Node D<br>Existing Node E<br>Existing Node F | 55%<br>25%<br>20% | 50% | To D |
| N | Rapid7.N | 92.62.52.1 | 00-1B-2F-BB-4C-9B | Win10 | Gold | Existing Node B<br>Existing Node C<br>Existing Node D | 65%<br>5%<br>30% | 60% | To B |

FIG. 5

NETWORK ASSET CORRELATOR FOR CYBERSECURITY OPERATIONS

CROSS-REFERENCE TO RELATED APPLICATIONS

The present application claims the benefit of priority (and is a Continuation) of pending U.S. Utility patent application Ser. No. 16/149,240 filed on Oct. 2, 2018 titled "Computing Entity Resolution for Network Asset Correlation," the disclosure of which is incorporated by reference as if set forth in its entirety herein.

BACKGROUND

Field of the Disclosure

This disclosure is related to computer and network security. In particular, this disclosure is related to utilizing computing entity resolution for network asset correlation.

Description of the Related Art

Modern computing networks support a significant number of computing assets (e.g., both physical and/or virtual computing devices). Efficiently locating and accurately identifying such computing assets (e.g., for incident detection and/or vulnerability management purposes) is of paramount importance to modern enterprises.

Asset correlation is a process to uniquely identify assets (e.g., computing devices, virtual machines, containers, and the like) by utilizing network attributes associated with these assets. For example, asset correlation can correlate newly-scanned nodes to previously-identified assets (e.g., when a threshold commonality is met, among other factors).

Entity resolution is a process of linking records across disparate systems to real-world entities despite variations in the underlying data. For example, entity resolution can find records in a dataset that refer to the same entity across different data sources (e.g., persons files, websites, databases, and the like), and can join datasets that may or may not share a common identifier (e.g., a database key, a unique identifier, and the like).

Unfortunately, existing record linkage mechanisms have not been utilized specifically for resolving computing entities in complex network environments. In addition, existing entity resolution methodologies are not applied to (and do not take advantage of) network asset correlation techniques in such complex network environments to uniquely identify network computing assets and correlate these network computing assets to previously-identified (or previously-known) computing nodes.

SUMMARY OF THE DISCLOSURE

Disclosed herein are methods, systems, and processes to perform computing entity resolution for network asset correlation. One such method involves receiving a scanned dataset that includes newly scanned node information that identifies newly scanned nodes in a network from a security server. In this example, the newly scanned node information indicates that the newly scanned nodes cannot be identified as being part of existing computing devices in the network. Therefore, to perform security action(s) with optimized computer resource allocation, the newly scanned node information is processed with a network access correlator that results in a set of asset correlation results for the newly scanned nodes. Next, an existing computing device is identified based on a highest disparate correlation probability in the set of asset correlation results and the security server is instructed to perform a security action on the identified existing computing device.

In one embodiment, the network asset correlator probabilistically indicates a disparate correlation between each existing computing device and each of the newly scanned nodes. In another embodiment, the security action includes determining, based on the highest disparate correlation probability, that the identified existing computing device should be over-provisioned with computing resources compared to at least one of the one or more newly scanned nodes. Examples of security actions include a vulnerability assessment or a decoy provisioning.

In certain embodiments, another existing computing device is identified based on a disparate correlation probability in the set of asset correlation results exceeding an entity resolution threshold and is included in the security action.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings and/or figures.

FIG. 5 is a network asset correlation table 500, according to one embodiment of the present disclosure.

Figure 1:
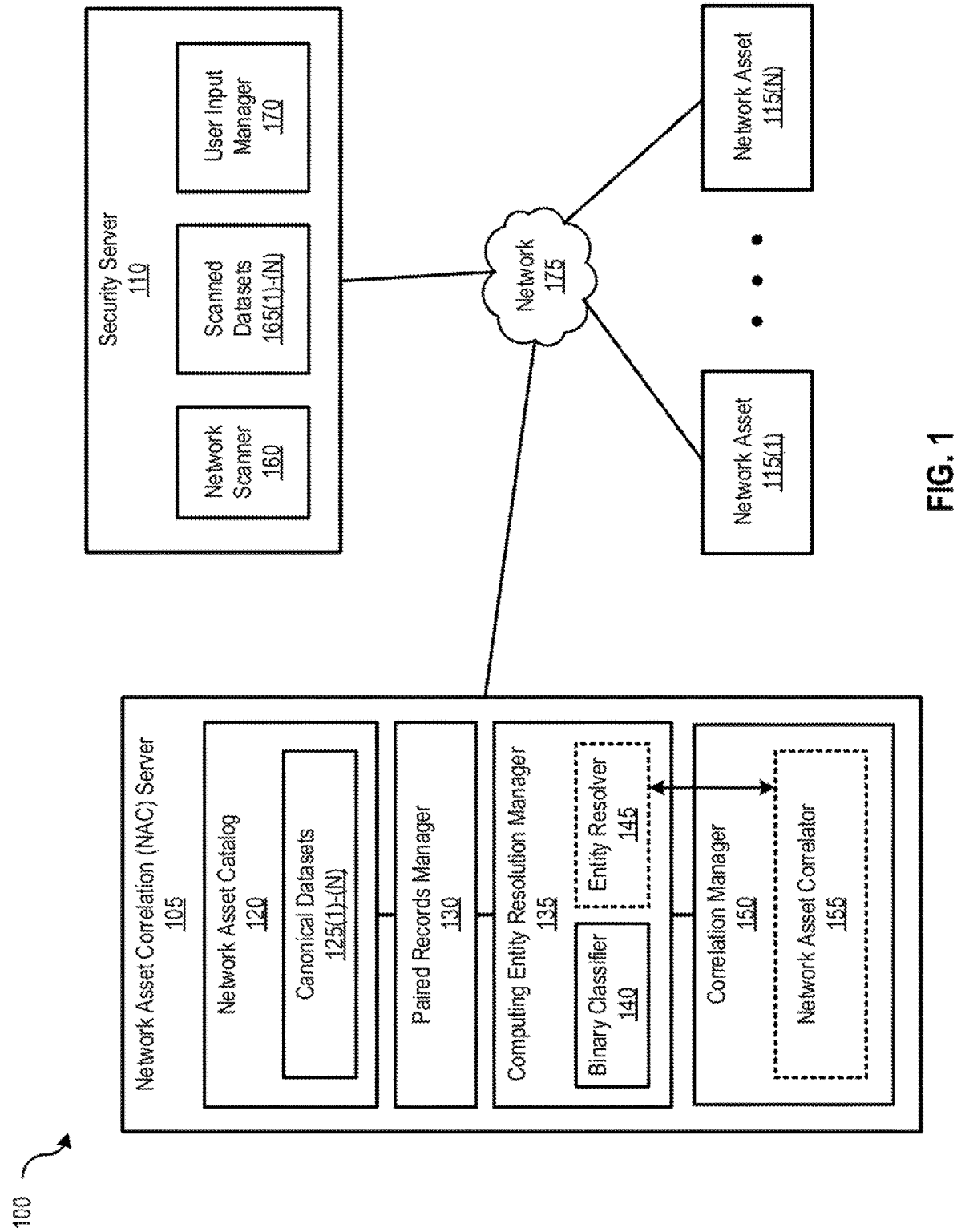
FIG. 1 is a block diagram 100 of a computing system that includes a network asset correlation (NAC) server that performs computing entity resolution for network asset correlation, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Complex computing networks used by modern businesses, organizations, and enterprises include, implement, and support a significant number of computing assets (e.g., physical computing devices such as desktop computers, laptop computers, mobile devices, network switches, routers, Internet of Things (IoT) connected devices, System on a Chip (SoC) devices and the like, as well as virtual computing devices such as virtual machines, containers, and the like). Unfortunately, these critical computing assets are frequently the target and victims of malicious attacks by hackers and other malevolent actors.

To adequately and proactively protect an enterprise against such malicious attacks, each computing asset that is part of the enterprise network(s) must be quickly located and accurately identified. An important aspect of locating and identifying such computing assets includes precisely determining whether a newly-discovered computing asset is an existing and/or a previously-known computing asset. This determination has a significant impact on the provisioning and allocation of expensive computing resources (e.g., processing power, storage latency, network bandwidth, and the like) required to perform security actions (e.g., based on incident detection, security vulnerabilities, and other parameters).

Appropriate security measures (and the provisioning of such security measures) may not be implemented or may be implemented incorrectly if a given computing asset is not correctly identified as a newly-discovered computing asset or a previously-known (or previously-existing) computing asset. For example, if a computing asset is not accurately identified as a new entrant to a computer network, the new entrant may be under-provisioned with respect to computing resources required to protect the computing asset. On the contrary, if a newly-discovered computing asset (e.g., a virtual machine located as part of a network scanning operation, and the like) is not accurately identified as a previously-known (or previously-existing) computing asset, the newly-discovered computing asset may be over-provisioned with respect to computing resources required to protect the newly-discovered computing asset. Therefore, efficiently locating and accurately identifying such computing assets (e.g., for incident detection and/or vulnerability management purposes) is of paramount importance to modern enterprises.

Network asset correlation is a process to uniquely identify computing assets (e.g., physical computing devices, virtual machines, containers, and the like) by utilizing network attributes associated with these assets (e.g., Internet Protocol (IP) addresses, Media Access Control (MAC) addresses, hostnames, system processes associated with the computing assets, software executing on the computing assets, and other comparable unique identifiers). For example, network asset correlation can correlate newly-scanned nodes (e.g., a computing asset that is a new entrant in an enterprise network) to previously-identified, previously-existing, or previously-known computing assets (e.g., when a threshold commonality is met, among other factors).

Computing entity resolution is a process of linking records across disparate systems to computing entities despite variations in the underlying data. For example, computing entity resolution can find records in a dataset that refer to the same computing entity (or computing asset) across different data sources (e.g., files, websites, databases, catalogs, and the like), and can join (or merge) datasets that may or may not share a common identifier (e.g., a database key, a unique identifier, and the like).

Identifying a computing asset that merits consideration from a security standpoint requires an understanding that the definition of what a computing asset is varies in different computing and/or networking environments. For example, a single physical computing device can support and execute multiple virtual machines and/or containers. In cloud computing environments, the fast pace with which instance-based computing can be implemented introduces an added layer of complexity in promptly identifying and adequately provisioning such computing assets for security actions.

Unfortunately, existing computing entity resolution mechanisms have not been utilized for specifically resolving disparate computing entities in complex computing and/or networking environments. In addition, current network asset correlation techniques typically rely on manually defined rules and thresholds, and do not utilize machine learning techniques. Therefore, the application of computing asset correlation methodologies to perform network asset correlation is not optimized and is computing resource intensive. Disclosed herein, are methods, systems, and processes to perform computing entity resolution for network asset correlation, while minimizing computational complexity.

Example Network Asset Correlation (NAC) Server

FIG. 1 is a block diagram 100 of a computing system that includes a network asset correlation (NAC) server 105 that performs computing entity resolution for network asset correlation, according to one embodiment. NAC server 105 is communicatively coupled to a security server 110 and network assets 115(1)-(N) via network 175. Any type of network and/or interconnection other than (or in addition to) network 175 can be used to facilitate communication between node 105, source server 140, master server 165, and target server 180 (e.g., the Internet). NAC server 105 and security server 110 can each be any of a variety of different types of computing devices, including a server, personal computing device, laptop computer, netbook, personal digital assistant, cellular phone, or the like. Network assets 115(1)-(N) can each be any of a variety of physical and/or virtual computing devices or nodes such as a desktop computer, a laptop computer, a mobile device, a tablet, a virtual machine, a container, and the like. It should be noted that network assets 115(1)-(N) are referred to herein as computing assets, computing devices, and/or computing entities.

NAC server 105 includes at least a network asset catalog 120, a paired records manager 130, a computing entity resolution manager 135, and a correlation manager 150. Network asset catalog 120 includes one or more records, lists, and/or datasets of identified, known, and/or existing computing assets. For example, network asset catalog 120 includes canonical datasets 125(1)-(N). In certain embodiments, canonical dataset (e.g., canonical dataset 125(1)) is a deduplicated set/list of known computing assets (e.g., a unique set of known computing assets with no duplicates), and NAC server 105 can perform a deduplication operation on more or more datasets to generate canonical datasets 125(1)-(N).

Security server 110 includes at least a network scanner 160, scanned datasets 165(1)-(N), and a user input manager 170. Network scanner 160 performs one or more network scanning operations to locate and identify one or more network assets 115(1)-(N). Security server 110 then generates one or more scanned datasets 165(1)-(N) based on network assets identified as part of the network scanning operation performed by network scanner 160. User input manager 170 receives one or more user inputs (e.g., indicating whether a network asset that is part of a scanned dataset matches another network asset that is part of a canonical dataset).

Paired records manager 130, which is implemented by NAC server 105, manages the classification of pairs of records (e.g., a record of a network asset from a scanned dataset and a record of the same network asset (or a different network asset) from a canonical dataset). Binary classifier 140, which is part of computing entity resolution manager 135 classifies one or more pairs of records as matching or not matching. In one embodiment, binary classifier 140 optimizes a weight of an input variable (e.g., an input variable that is responsive to a user input, such as particular network attribute that is of particular importance or deserves special consideration in a given computing and/or networking environment) to maximize accurate matches between a scanned dataset record and a canonical dataset record. For example, the weight of the input variable can be assigned by computing entity resolution manager 135 based on extracting one or more network attributes from a network asset scanned by network scanner 160 (e.g., a network asset with a randomly recycled IP address) and determining whether the extracted network attribute deviates from current, past, and/or historical thresholds for the given network attribute.

By optimizing the weight of input variables, computing entity resolution manager 135 configures paired records manager 130 and binary classifier 140 to maximize the accuracy of matches between a record in a scanned dataset and a record in a canonical dataset. In certain embodiments, because computing entity resolution manager 135 configures binary classifier 140 to utilize weighted input variables, user inputs received by user input manager 170 become merely representative because a user input is not (or may not be) required for every instance of ambiguity (e.g., between a record in a scanned dataset and a record in a canonical dataset). Instead, a user input can be used to clarify groups that are similarly ambiguous, enabling computing entity resolution manager 135 to utilize only a small number of user inputs (e.g., a few dozen) to generalize discriminations across a significant number of record comparisons in scanned datasets and canonical datasets.

Computing entity resolution manager 135 also includes entity resolver 145. Entity resolver 145 performs computing entity resolution by linking records from canonical datasets maintained by NAC server 105 and scanned datasets maintained by security server 110 despite variations between the canonical and scanned datasets. Because entity resolver 145 is implemented by computing entity resolution manager 135 in conjunction with binary classifier 140, entity resolver 145 can optimize entity resolution in the context of asset correlation.

NAC server 105 also includes correlation manager 150. In one embodiment, correlation manager 150 generates a network asset correlator 155 that works in conjunction with entity resolver 145 to facilitate network asset correlation that takes advantage of computing entity resolution. For example, because NAC server 105 has access to records from scanned and canonical datasets classified by binary classifier 140 and resolved by entity resolver 145 (e.g., classified using a combination of user input(s) and machine learning techniques), correlation manager 150 generates one or more network asset correlators that can be configured to uniquely identify computing assets in disparate and complex datasets, and then reconfigured to account for idiosyncrasies of particular computing and/or networking environments.

Figure 2A:
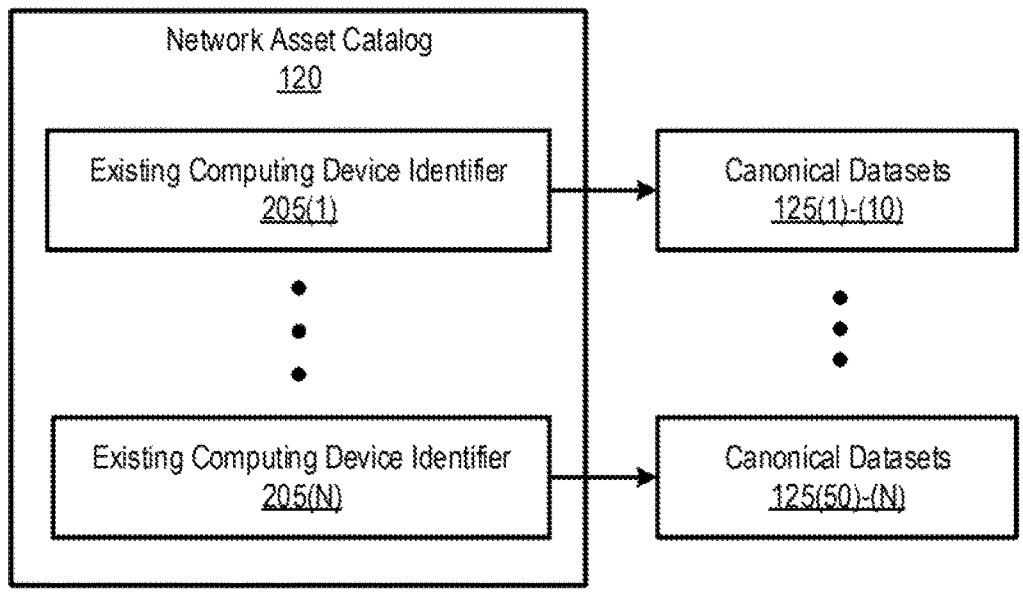
FIG. 2A is a block diagram 200A of a network asset catalog, according to one embodiment of the present disclosure.

FIG. 2A is a block diagram 200A of a network asset catalog, according to one embodiment. Network asset catalog 120 includes the identities of known and/or pre-existing computing entities in a given computing and/or networking environment. For example, network asset catalog 120 includes existing computing device identifiers 205(1)-(N) that each correspond to one or more canonical datasets. For example, as shown in FIG. 2A, existing computing device identifier 205(1) corresponds to canonical dataset 125(1)-(10) and existing computing device identifier 205(N) corresponds to canonical datasets 125(50)-(N). By associating an existing computing device identifier to one or more canonical datasets, network asset catalog 120 facilitates the deduplication of canonical datasets to ensure that no duplicate existing computing device identifiers are present, thus permitting paired records manager 130 to accurately pair a record from a canonical dataset to a record from a scanned dataset.

Figure 2B:
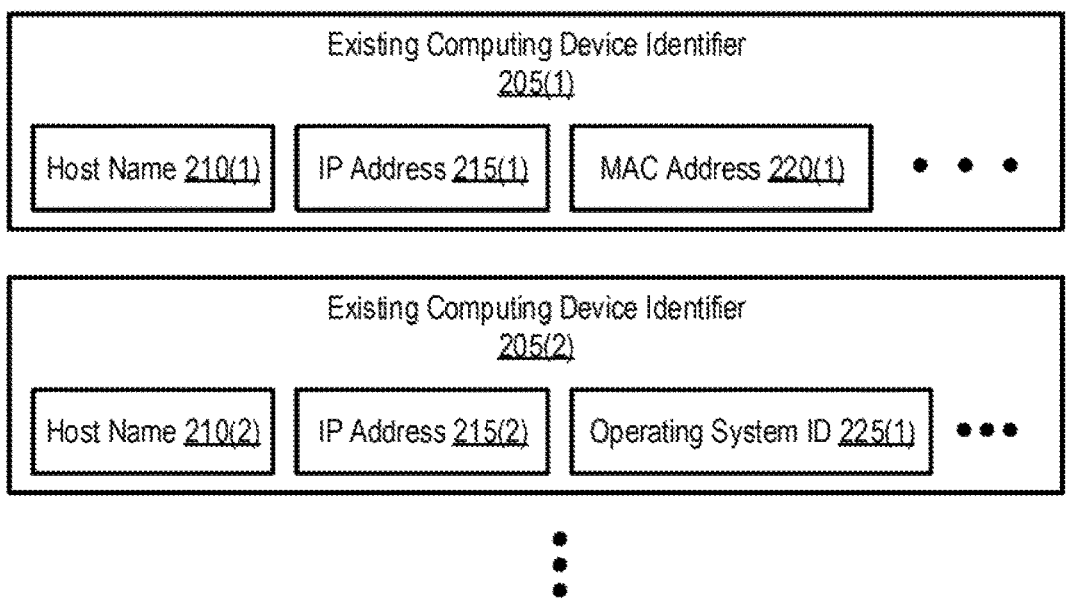
FIG. 2B is a block diagram 200B of network attribute identifiers, according to one embodiment of the present disclosure.

FIG. 2B is a block diagram 200B of network attribute identifiers, according to one embodiment. Each existing computing device identifier includes at least a host name, an IP address, a MAC address, a system process associated with a computing asset, and/or software executing on a computing access. For example, an existing computing device identifier 205(1) includes at least a host name 210(1), an IP address 215(1), and a MAC address 220(1), whereas an existing computing device identifier 205(2) includes at least a host name 210(2), an IP address 215(2), and an operating system ID 225(1). As noted, several other network attributes such as hardware, processes, software, and the like can be part of existing computing devices identifiers, and such network attributes can be used to generate input variables of different weights, which in conjunction with user input(s), can be used to generate network asset correlator 155.

Example of Optimizing a Computing Entity Resolver

Figure 3A:
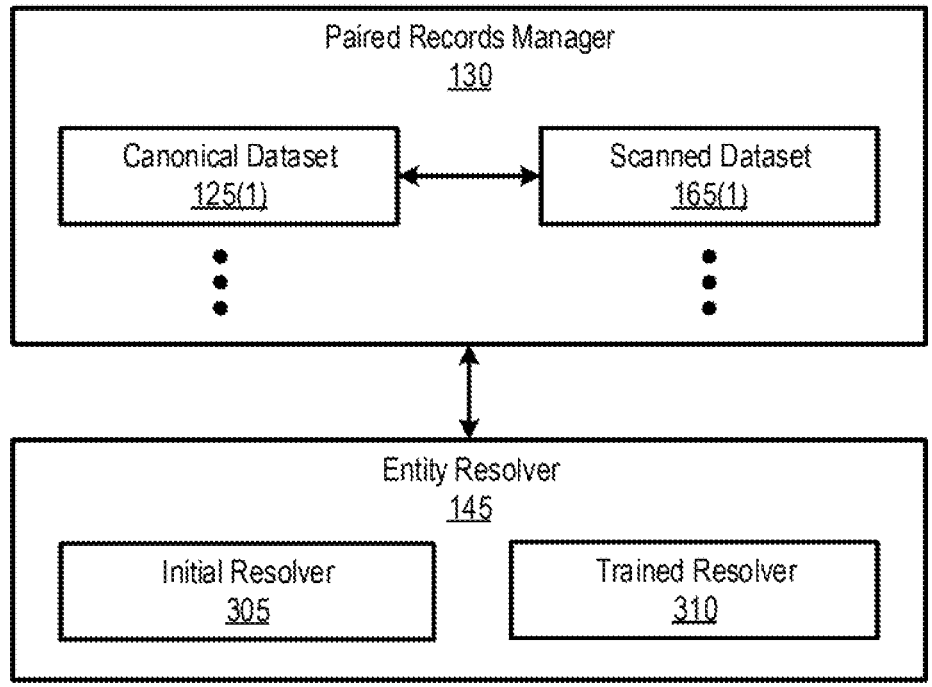
FIG. 3A is a block diagram 300A of a paired records manager and an entity resolver, according to one embodiment of the present disclosure.

FIG. 3A is a block diagram 300A of a paired records manager and an entity resolver, according to one embodiment. Paired records manager 130 pairs canonical datasets and scanned datasets. For example, paired records manager 130 pairs canonical dataset 125(1) with scanned dataset 165(1), or pairs a record that is part of canonical dataset 125(1) with a record that is part of scanned dataset 165(1). Entity resolver 145 includes an initial resolver 305 and a trained resolver 310. Initial resolver 305 retrieves one or more user inputs from security server 110 and uses the user input(s) to classify a pair of records (e.g., whether a record from canonical dataset 125(1) matches another record from scanned dataset 165(1)). Once a sufficient number of user inputs are received and used to classify paired records (e.g., one or two dozen user inputs), trained resolver 310 does not require subsequently user input(s) to classify every instance of ambiguity (e.g., a difference in network attributes between paired records). Instead, trained resolver 310 can be configured to generalize discriminations associated with paired record ambiguities or differences across multiple paired record comparisons performed by paired records manager 130.

Figure 3B:
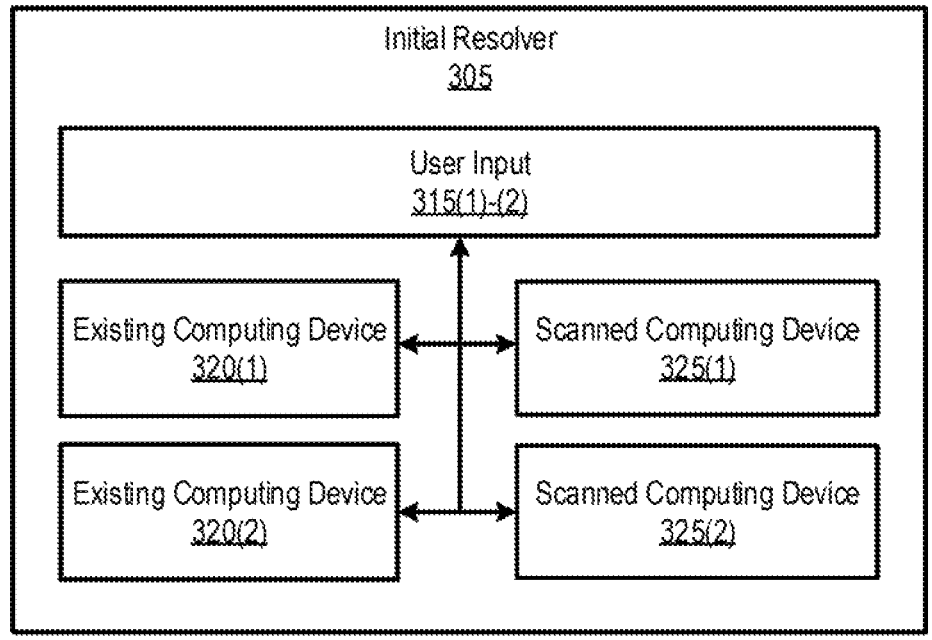
FIG. 3B is a block diagram 300B of an initial resolver, according to one embodiment of the present disclosure.

FIG. 3B is a block diagram 300B of an initial resolver, according to one embodiment. Initial resolver 305 processes one or more user inputs 315(1)-(2) that indicate whether an existing computing device matches a scanned computing device (e.g., whether existing computing device 320(1) matches scanned computing device 325(1) and whether existing computing device 320(2) matches scanned computing device 325(2)). Because user inputs 315(1)-(2) are provided and/or processed by NAC server 105 to clarify groups (or records) that are similarly ambiguous, initial resolver 305 can be reconfigured by entity resolver 145 to generate trained resolver 310. Trained resolver 310 can then be utilized by entity resolver 145 to generalize discriminations across multiple comparisons between existing computing devices and scanned computing devices, without requiring further user input(s).

In one embodiment, initial resolver 305 and trained resolver 310 classify pairs of records as "match" or "not match" and optimize the weights of particular input variables to enable the maximization of accurate matches while reducing the need for subsequent user input(s) by facilitating the combination of user input(s) and machine learning to increase the accuracy and speed of record matching.

In another embodiment, accepting user input(s) permits the generation of network asset correlator 155 that can be configured (and then reconfigured multiple times) to account for the unique characteristics of particular computing and/or networking environments. In this example, correlation manager 150 provides a user interface that permits the identification of newly-scanned nodes and their correlation to previously-identified assets. Because network asset correlator 155 can be recreated by correlation manager 150 based on when and/or how user input(s) and weighted input variables affect computing entity resolution (e.g., the matching between one or more records in canonical datasets and one or more records in scanned datasets), network asset correlator 155 can be reconfigured to adapt to changing computing and/or networking environments (e.g., cloud computing environments, and the like).

Figure 4A:
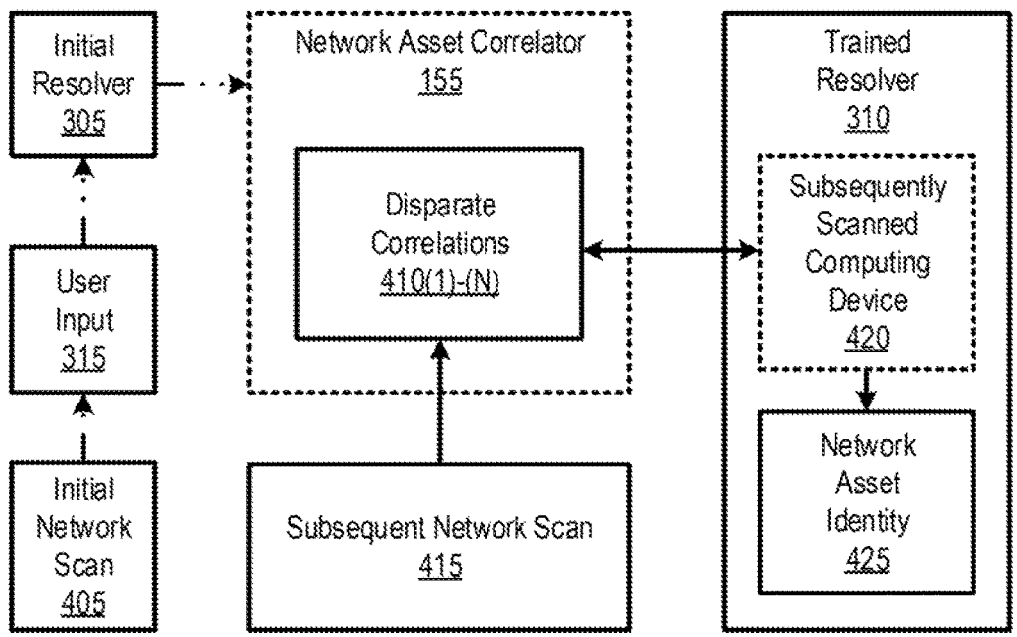
FIG. 4A is a block diagram 400A of a network asset correlator and a trained resolver, according to one embodiment of the present disclosure.

Example of Probabilistically Identifying a Network Asset With Disparate Correlations FIG. 4A is a block diagram 400A of a network asset correlator and a trained resolver, according to one embodiment. Network asset correlator 155 and trained resolver 310 can be used to perform network asset correlation that benefits from computing entity resolution. In one embodiment, computing entity resolution manager 135 access canonical dataset 125(1) that includes an identity of each of existing computing devices 320(1)-(N) and receives, from security server 110, a first scanned dataset (e.g., scanned dataset 165(1)) generated by security server 110 by performance of an initial set of network scanning operations (e.g., using network scanner 160) that includes an identity of a first scanned computing device (e.g., a network asset that is part of network assets 115(1)-(N)).

Paired records manager 130 then generates paired records from canonical dataset 125(1) and scanned dataset 165(1) that includes the identities of one or more of existing computing devices 320(1)-(N) and the identity of the first scanned computing device (e.g., identities based on one or more network attributes or other comparable unique identifiers). Computing entity resolution manager 135 then receives user input(s) (e.g., from user input manager 170) that indicate whether the identity of the first scanned computing device matches the identity of an existing computing device. Correlation manager 150 then generates network asset correlator 155 that indicates a disparate correlation (e.g., disparate correlation 410(1)) between each existing computing device and a second scanned computing device.

In this example, the second scanned computing device (e.g., subsequently scanned computing device 420 as shown in FIG. 4A) is part of a second scanned dataset (e.g., scanned dataset 165(2)) generated by security server 110 by performance of a subsequent network scan 415 (or a subsequent set of network scanning operations), without requiring a subsequent user input. Because network asset correlator generates disparate correlations 410(1)-(N) that correspond to one or more of existing computing devices 320(1)-(N), trained resolver 310 is able to accurately and probabilistically identify a network asset identity 425 of subsequently scanned computing device 420 without requiring a subsequent user input or unique identifier associated with subsequently scanned computing device 420. Using disparate correlations 410(1)-(N) instead of unique identifiers and/or user input(s) saves expensive computing resources from being used to identify network assets and also prevents such computing resources from being over-provisioned or under-provisioned to the network assets for security operations.

In some embodiments, the canonical dataset includes a first set of records that identify one or more existing computing devices (e.g., existing computing devices 320(1)-(N)) and a first scanned dataset (e.g., scanned by subsequent network scan 415) includes a second set of records that identify a first scanned computing device (e.g., subsequently scanned computing device 420). In this example, the first set of records and the second set of records are compared by initial resolver 305 by receiving user input 315 that indicates whether the identity of the first scanned computing device (e.g., subsequently scanned computing device 420) matches the identity of the existing computing device (e.g., a known and/or existing computing asset that is part of one or more canonical datasets).

In other embodiments, the first scanned computing device may or may not be part of the universe of known and/or existing computing assets (e.g., for the purpose of being identified for security vulnerabilities and/or incident detection purposes) and the paired records used to train network asset correlator 155 to probabilistically identify the first scanned computing device based on disparate correlations can be (initially) generated (e.g., by paired records manager 130) by grouping one or more records from the first set of records and the second set of records based on a degree or commonality (e.g., by performing a blocking operation). In this example, network asset correlator 155 can be configured to be implemented by security server 110, for example, by being transmitted to security server 110 after being generated (e.g., by NAC server 105).

Figure 4B:
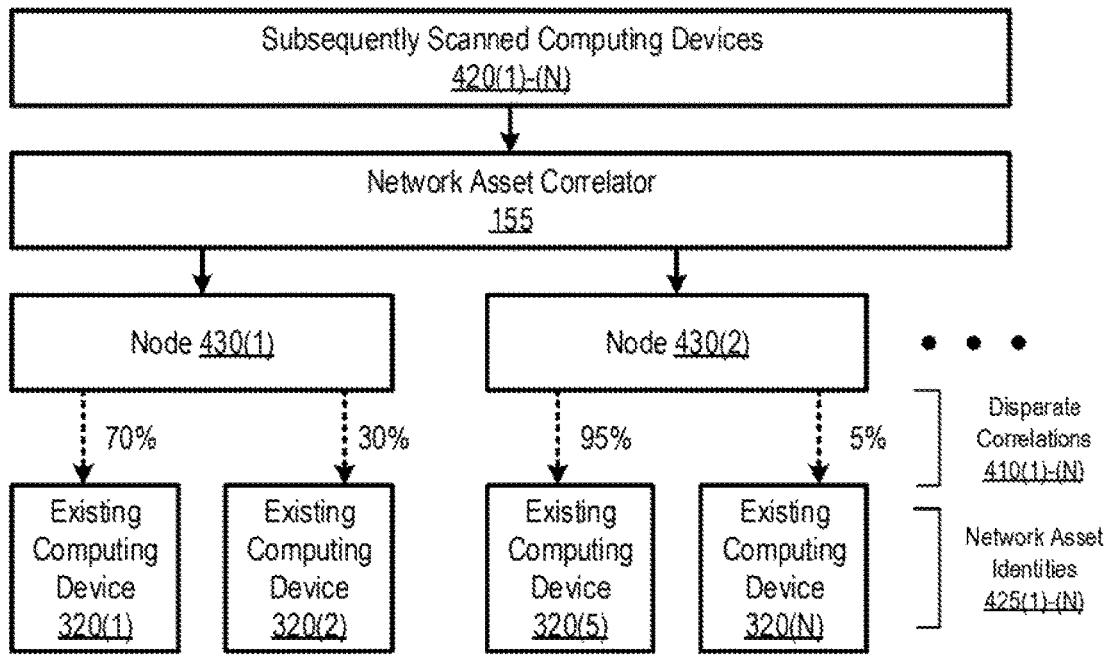
FIG. 4B is a block diagram 400B of scanned nodes processed by a network asset correlator, according to one embodiment of the present disclosure.

FIG. 4B is a block diagram 400B of scanned nodes processed by a network asset correlator, according to one embodiment. Processing scanned nodes (e.g., scanned computing devices 420(1)-(N) scanned by subsequent network scan 415) with network asset correlator 155 results in specific nodes (e.g., nodes 430(1) and 430(2)) being identified and being disparately correlated with existing computing devices (e.g., existing computing devices 320(1), 320(2), 320(5), and 320 (N)). For example, node 430(1) is identified by network asset correlator 155 and is disparately correlated as being existing computing device 320(1) with a 70% probability and existing computing device 320(2) with a 30% probability. Similarly, node 430(2) is identified by network asset correlator 155 and is disparately correlated as being existing computing device 320(5) with a 95% probability and existing computing device 320(N) with a 5% probability. Network asset identities 425(1)-(N) can then be assigned to the existing computing devices based on the existing computing devices being disparately correlated to a given node.

Example Network Asset Correlation Table

FIG. 5 is a network asset correlation table 500, according to one embodiment. An example network asset correlation table 505 includes at least a new node field 510, a host name field 515, an IP address field 520, a MAC address field 525, an operating system (OS) field 530, an operating profile field 535, an asset correlation field 545, a resolution threshold field 550, and an entity resolution field 555. In certain embodiments, network asset correlation table 505 can be maintained by either NAC server 105 or by security server 110 to perform one or more security actions (e.g., incident and/or intrusion detection, computer asset quarantine, network shutdown, decoy provisioning, vulnerability management, and the like).

For example, determining a vulnerability of an existing computing device can be based on a first disparate correlation between the given existing computing device and a second scanned computing device exceeding a correlation threshold (e.g., a resolution threshold as shown in FIG. 5) and indicating that the given second scanned computing device is strongly correlated to the existing computing device. Based on the foregoing determination, NAC server 105 can transmit an instruction to security server 110 causing security server 110 to perform a security operation to neutralize a vulnerability or to perform an incident detection operation.

As previously noted, generating network asset correlator 155 includes performing an initial computing entity resolution (operation) using initial resolver 305 to resolve a first scanned computing device with one or more existing computing devices (e.g., using user input(s)). Creating and implementing network asset correlator 155 permits performance of a subsequent computing entity resolution (operation) using trained resolver 310 (e.g., in conjunction with the disparate correlations identified by network asset correlator 155) to resolve a second scanned computing device with one or more existing computing devices without requiring one (or more) subsequent user inputs, thus optimizing the computing asset resolution process to efficiently identify new network assets for accurate (or appropriate) computing security resource provisioning.

In some embodiments, the identities of existing computing assets as well as the first and subsequent scanned computing assets can be based on one or more of at least a host name, an IP address, a MAC address, an OS, a process, or a software associated with the existing computing assets and the first and subsequent scanned computing assets. In other embodiments, the existing computing devices, the first scanned computing device, and the second scanned computing device are each not associated with a unique identifier, and the user input(s) are each responsive to at least one query associated with the paired records.

As shown in FIG. 5, node X has a host name of Rapid7.X, an IP address of 100.101.0.1, a MAC address of 08-00-27-72-86-BB, an OS of Win10, and an operating profile of gold. Processing node X with network asset correlator 155 results in an asset correlation of 25% to existing node A, 65% to existing node B, and 10% to existing node C. Because node X has a resolution threshold of 60% (which can pre-determined or determined on-the-fly based on network and/or operating conditions), node X is resolved to existing node B (e.g., by trained resolver 310). In addition, network asset correlator 155 indicates there is a comparatively low probability that node X is either existing node A or existing node C, existing node A and/or existing node C can be appropriately provisioned (e.g., with network and/or storage computing resources), which existing node B can be re-provisioned based on updated security conditions applicable to the computing environment at that given point in time (e.g., as dictated by a gold operating profile). Therefore, probabilistically correlating and resolving a newly scanned node to an existing computing asset in a timely manner saves valuable computing resources and contributes to the appropriate provisioning of such computing resources to perform sensitive security actions.

In certain embodiments, network asset correlation table 505 can be used to not perform (or inhibit) computing entity resolution, thus saving valuable and expensive computing, storage, and/or network resources. For example, node Z has a host name of Rapid7.Z, an IP address of 192.168.0.1, a MAC address of 00-10-5A-44-12-B5, an OS of Linux, and an operating profile of bronze. Processing node Z with network asset correlator 155 results in an asset correlation of 30% to existing node C, 30% to existing node E, and 40% to existing node F. Because node Z has a resolution threshold of 85%, entity resolution is not performed with respect to node Z, thus preventing or inhibiting node Z from being configured with a security profile and/or from being considered as a vulnerable node with respect to performing one or more security actions. In this example, the resolution threshold for a given node can be increased or decreased in network asset correlation table 505 (e.g., by NAC server 105), based on one or more intrusion detection alerts and/or notifications received (e.g., from security server 110).

Therefore, it will be appreciated that the foregoing methods and systems can be used to perform computing entity resolution for network asset correlation. Processing a newly scanned computing asset with (the created/generated) network asset correlator 155 permits an optimized probabilistic determination that the newly scanned node is (or is not) a pre-existing computing asset. Identifying newly scanned network assets in this manner permits valuable computing resources to be allocated and/or de-allocated, as necessary, for the performance of security actions with respect to such network and computing assets.

Example Processes to Resolve Computing Entities for Network Asset Correlation

Figure 6A:
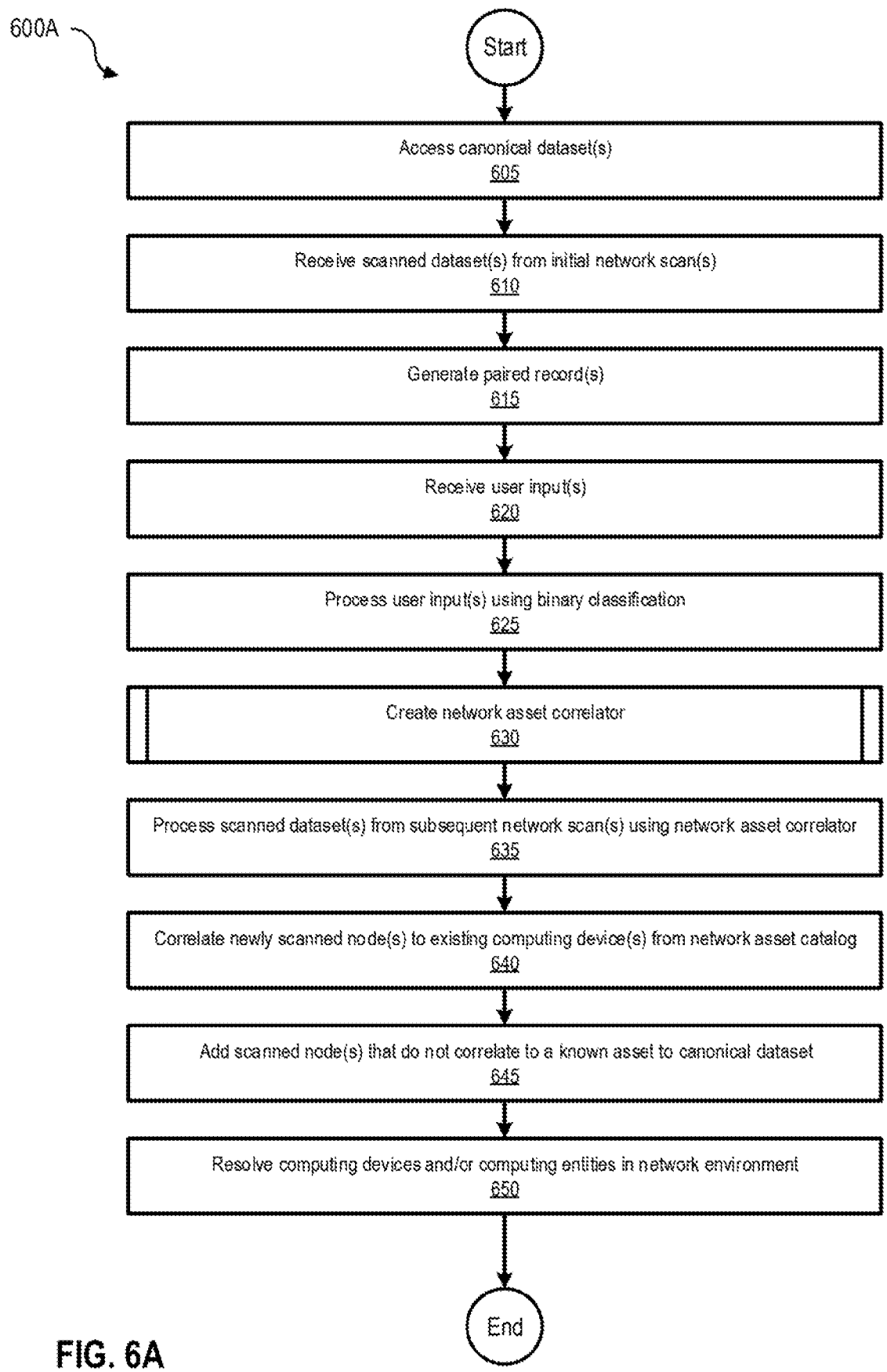
FIG. 6A is flowchart 600A that illustrates a process for resolving computing entities in a network environment, according to one embodiment of the present disclosure.

FIG. 6A is flowchart 600A that illustrates a process for resolving computing entities in a network environment, according to one embodiment. The process begins at 605 by accessing (or generating) canonical datasets (e.g., canonical datasets 125(1)-(N)). The canonical datasets can be part of and/or derived from a network asset catalog 120 that includes identities of one or more existing computing assets. At 610, the process receives scanned dataset(s) from initial network scans (e.g., one or more scanned datasets 165(1)-(N) generated by security server 110 using network scanner 160). At 615, the process generates paired records (e.g., using paired records manager 130), and at 620, receives user input(s) (e.g., from user input manager 170). At 625, the process processes the user input(s) using binary classification.

At 630, the process creates a network asset correlator (e.g., network access correlator 155), and at 635, processes scanned datasets from subsequent network scans using the network access correlator. At 640, the process correlates newly scanned nodes to existing computing devices (e.g., node X to existing node B as shown in FIG. 5), and at 645, adds scanned nodes that do not correlate to a known asset to the canonical dataset. The process ends at 650 by resolving computing devices and/or computing entities in the network environment.

Figure 6B:
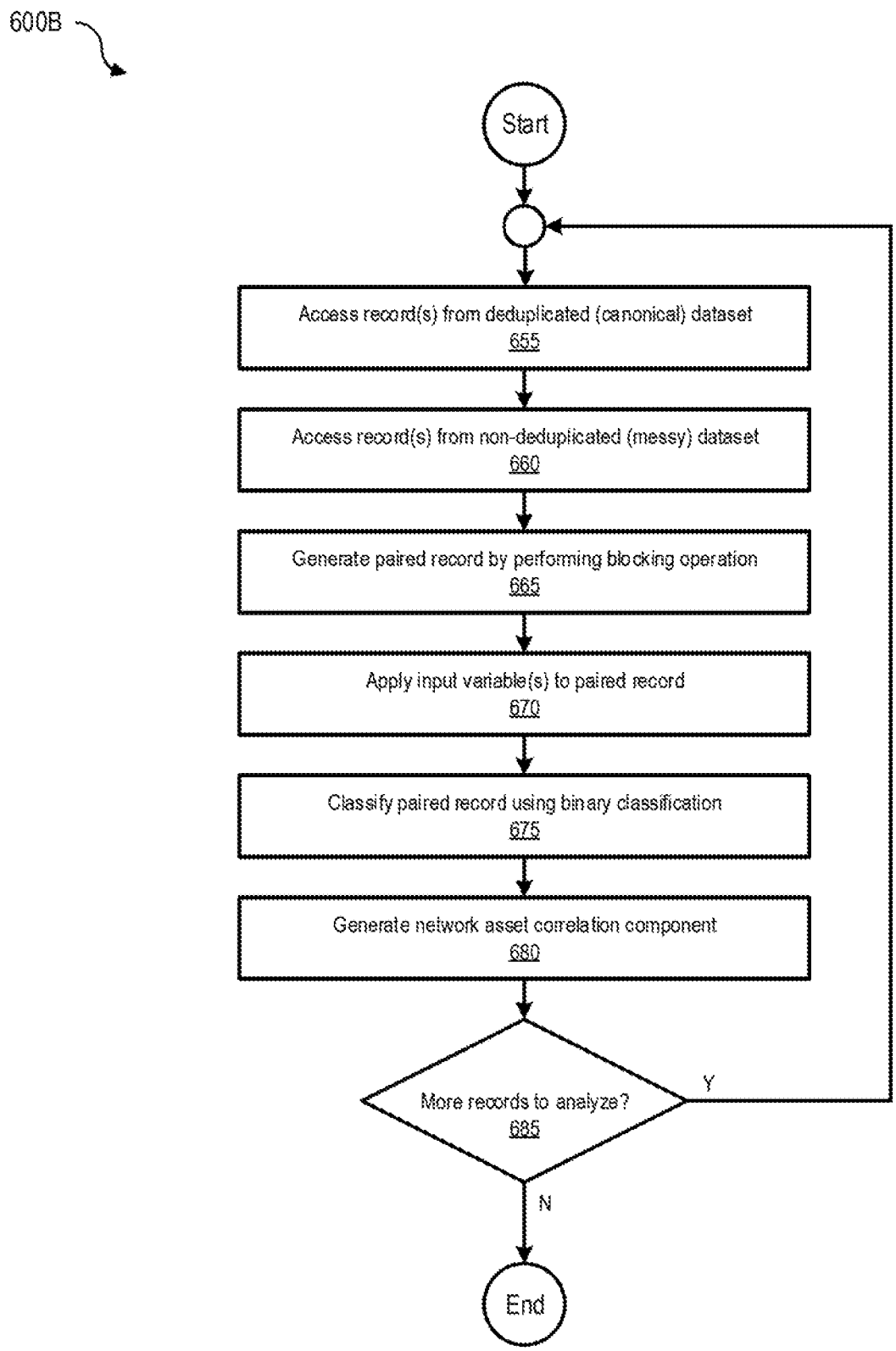
FIG. 6B is a flowchart 600B that illustrates a process for generating a network asset correlator, according to one embodiment of the present disclosure.

FIG. 6B is a flowchart 600B that illustrates a process for generating a network asset correlator, according to one embodiment. The process begins at 655 by accessing records from a deduplicated canonical dataset, and at 660, accesses records from a non-deduplicated dataset. At 665, the process generates a paired record (e.g., by performing a blocking operation), and at 670, applies input variables to the paired record. At 675, the process classifies the paired record using binary classification (e.g., "match" or "no match"), and at 680, generates a network asset correlation component (e.g., network asset correlator 155). At 685, the process determines if there are more records to analyze. If there are more records to analyze, the process loops to 655. Otherwise, the process ends.

In one embodiment, the process accesses a canonical dataset (e.g., a dataset with deduplicated data identifying existing, pre-known, and/or pre-existing computing assets) and a messy dataset (e.g., a scanned dataset with identities of newly scanned nodes) using paired records manager 130. In this example, records from the messy dataset may or may not refer to the same (real life) computing assets referenced in the canonical dataset. In another embodiment, features and/or characteristics associated with the computing assets to be examined and the manners in which the features are to be examined are specified (e.g., features such as IP addresses, MAC addresses, hostnames, OS used, system processes, software, hardware, and/or other identifying characteristics may be specified in network asset correlation table 505). In this example, the manners of examination (e.g., performed by computing entity resolution manager 135) may include numerical value comparisons, word commonality comparisons for large blocks of text, n-gram comparisons for multi-word files, and substring comparisons for strings. For a given feature, multiple feature examination methods can be performed (e.g., a numerically expressed field can be compared numerically or as a string).

Once the feature and feature examination methods are specified, computing entity resolution manager 135 can compare features between equivalent fields across the canonical datasets and messy datasets to identify potentially similar records. NAC server 105 then performs a blocking operation to group subsets of records across the canonical and messy datasets together (e.g., using paired records manager 130). Doing so permits significant improvements in performance when engaging in pairwise comparisons. Blocking assumes that for a pair of records to match, there must exist some degree of commonality. Records that exhibit a degree of commonality are grouped together by paired records manager 130 and a more detailed comparison is performed within groups. Comparing paired records in this manner changes the record comparison challenge from comparing one record against all to one record against a few, which significantly reduces the computational complexity, and thus, computing resources required to perform such comparisons for computing entity resolution.

In some embodiments, NAC server 105 randomly selects representative paired records, where one pair is from the canonical dataset and the other pair is from the messy dataset, and processes the paired records with user input(s) received from user input manager 170 to determine whether the pairs are a match, not a match, or are uncertain matches (e.g., using binary classifier 140). In this example, because the records are selected in a representative manner, a reduced number of user input(s) than otherwise would be required can be used to train entity resolver 145 even when using a significantly large dataset. In other embodiments, the user input establishes a training dataset that includes a binary target variable (e.g., "match" or "not match"). The target variable is used as the dependent variable in a supervised binary classification model (e.g., logistic regression), while the sets and subsets of the specified features are used as the independent variables. The logistic regression utilizes the training dataset to automatically optimize the values of the independent variable coefficients (e.g., weights) such that the probability of an accurate identification of matches and non-matches are maximized.

In certain embodiments, network asset correlator 155 and/or trained resolver 310 can be used to determine probabilities of pairwise matches within blocked set of pairs. For example, if records A, B, and C are grouped due to a similarity on a given feature, network asset correlator 155 and/or trained resolver 310 can determine that A and B are 80% likely to be a match, whereas pairs A and C and B and C are each 10% likely to be a match.

In one embodiment, an unsupervised clustering component (e.g., a hierarchical clustering component) can be applied block by block to determine when one or more paired records are sufficiently similar to be considered to be referring to the same computing asset and/or network asset. In the foregoing example, the unsupervised clustering component (which can be implemented as part of network asset correlator 155) can find that nodes A and B are the same computing asset, while node C is a different computing asset.

In another embodiment, records associated with computing assets that are deemed to be referring to the same real life computing asset are assigned the same cluster identifier by correlation manager 150. For example, a single cluster identifier can refer to one record from one dataset if the record is a unique record, or multiple records across one or multiple datasets if multiple records are deemed to refer to the same real life computing asset by correlation manager 150. In this example, the final count of unique computing assets is equivalent to the number of unique cluster identifiers.

Example Processes to Perform Security Operations

Figure 7A:
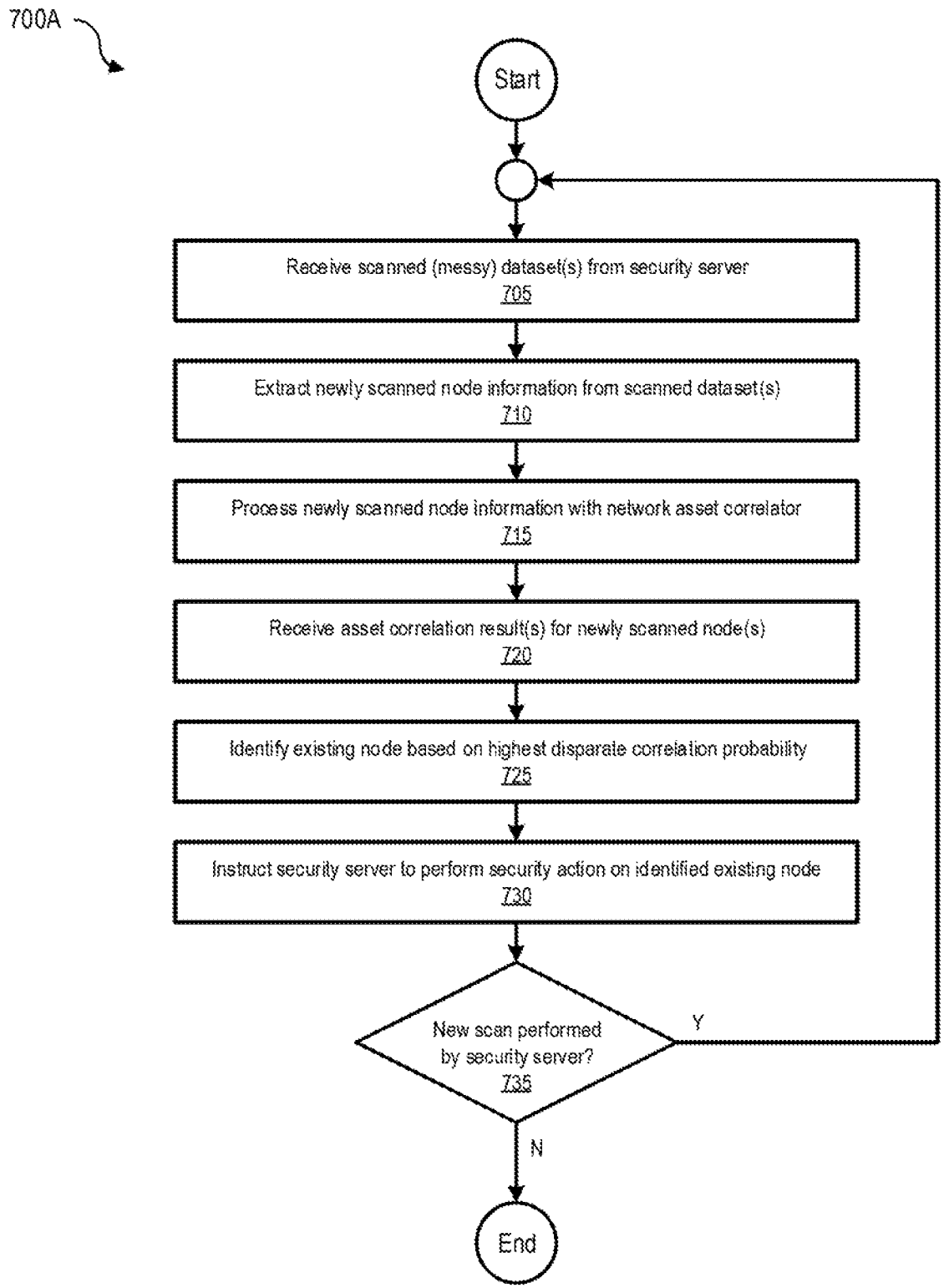
FIG. 7A is a block diagram 700A that illustrates a process for instructing a security server to perform a security action, according to one embodiment of the present disclosure.

FIG. 7A is a block diagram 700A that illustrates a process for instructing a security server to perform a security action, according to one embodiment. The process begins at 705 by receiving scanned (e.g., messy) datasets 165(1)-(N) from security server 110, and at 710, extracts newly scanned node information from the scanned datasets. At 715, the process processes the newly scanned node information with network asset correlator 155, and at 720, receives asset correlation results for the newly scanned nodes (e.g., as shown in FIG. 4B).

At 725, the process identifies an existing node (e.g., an existing computing device) based on the highest disparate correlation probability (e.g., existing computing devices 320(1) 320(5) as shown in FIG. 4B, and existing nodes B, E, D with respect to new nodes X, Y, and M, respectively, as shown in FIG. 5). At 730, the process instructs security server 110 to perform a security action on the identified existing node (e.g., a security vulnerability assessment, decoy provisioning, installing incident detection processes, gathering security information from a log, performing security information and event management (SIEM), and the like). At 735, the process determines if a new (network) scan has been performed by security server 110. If a new scan has been performed, the process loops to 705. Otherwise, the process ends.

Figure 7B:
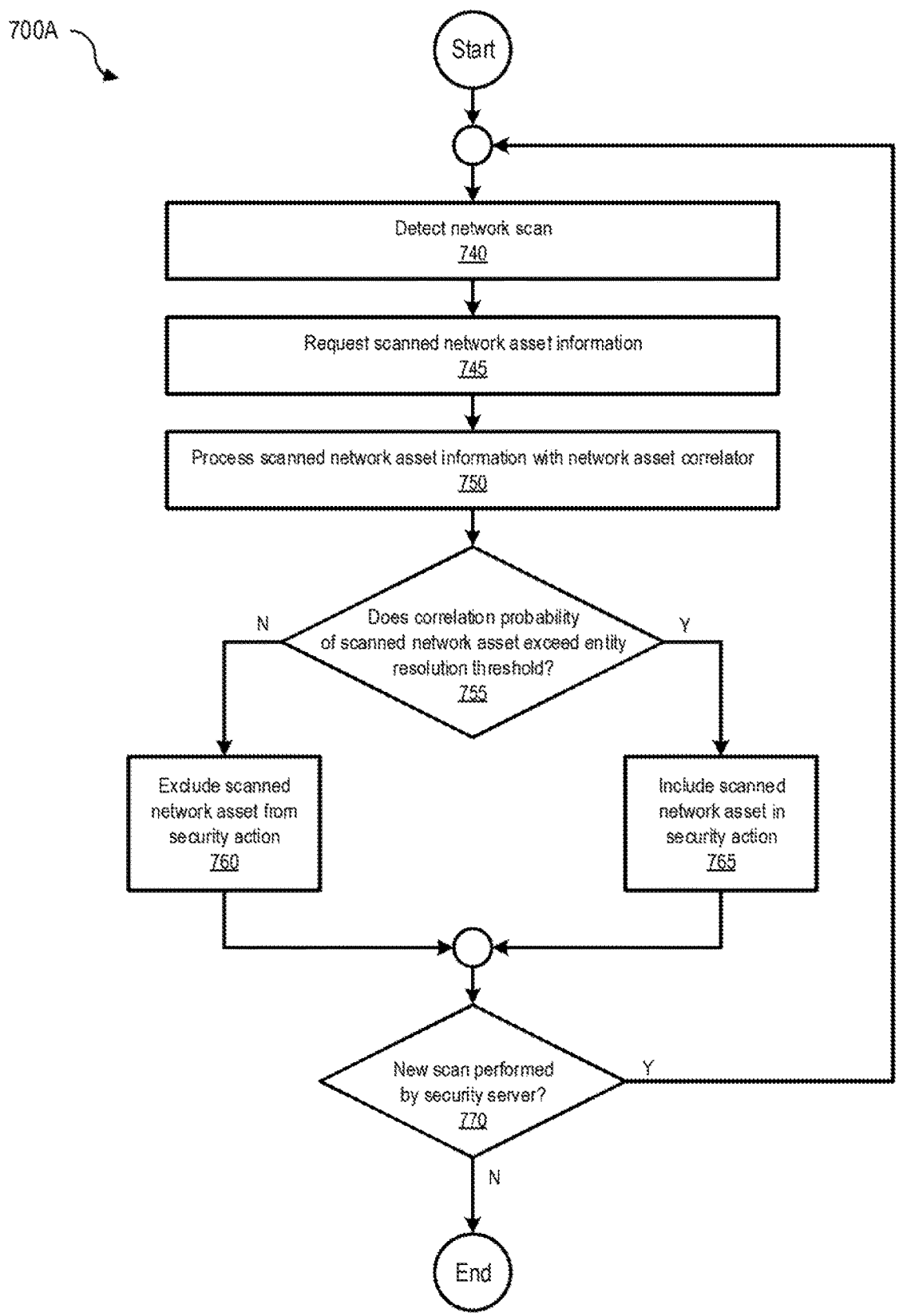
FIG. 7B is a block diagram 700B that illustrates a process for including or excluding a network asset from a security action, according to one embodiment of the present disclosure.

FIG. 7B is a block diagram 700B that illustrates a process for including or excluding a network asset from a security action, according to one embodiment. The process begins at 740 by detecting a network scan (e.g., performed by network scanner 160). At 745, the process requests scanned network asset information, and at 750, processes the scanned network asset information with network asset correlator 155. At 755, the process determines whether a correlation probability of a scanned network asset (e.g., a disparate correlation of disparate correlations 410(1)-(N) exceeds an entity resolution threshold (e.g., as indicated by network asset correlation table 505).

If the correlation probability of the scanned network does not exceed the entity resolution threshold, the process, at 760, excludes the scanned network asset from a security action. However, if the correlation probability of the scanned network exceeds the entity resolution threshold, the process, at 765, includes the scanned network asset in the security action. At 770, the process determines if a new (network) scan has been performed by security server 110. If a new scan has been performed, the process loops to 750. Otherwise, the process ends.

In one embodiment, a canonical dataset starts off as empty (e.g., with no entries) and is initially expanded to include identified unique nodes (e.g., network assets) upon a first (or initial) network scan. In subsequent network scans, previously-scanned unique (network and/or computing) assets are considered (and become part of) the canonical dataset. In another embodiment, a first set of scanned nodes is initially compared against the canonical dataset and computing assets that can be matched are matched. Computing assets that cannot be matched (e.g., immediately) are identified and presented for user input for guidance on matching.

In another embodiment, an unsupervised clustering model (e.g., hierarchical clustering) is applied block by block to determine when record pairs are sufficiently similar to be considered to be referring to the same computing asset. For example, the unsupervised clustering model might find that nodes A and B are the same computing asset, while node C is a different computing asset. In some embodiments, records that are deemed to be referring to the same real life asset are assigned the same cluster identifier. In this example, a single cluster identifier can refer to one record from one data set (e.g., if a truly unique record), or multiple records across one or multiple datasets (e.g., if multiple records are deemed to refer to the same computing asset). The final count of unique assets is equivalent to the number of unique cluster identifiers.

Therefore, it will be appreciated that the foregoing processes can be used to perform security actions by utilizing and optimizing computing entity resolution for network asset correlation. Processing a newly scanned computing asset using a network asset correlator and a trained resolver permits an optimized probabilistic determination that the newly scanned node may (or may not be) a pre-existing computing asset. Identifying newly scanned network assets in this manner permits such computing assets to be appropriately included in or excluded from security operations, thus conserving and/or efficiently allocating valuable computing resources in security-based computing environments.

Example Computing Environment

Figure 8:
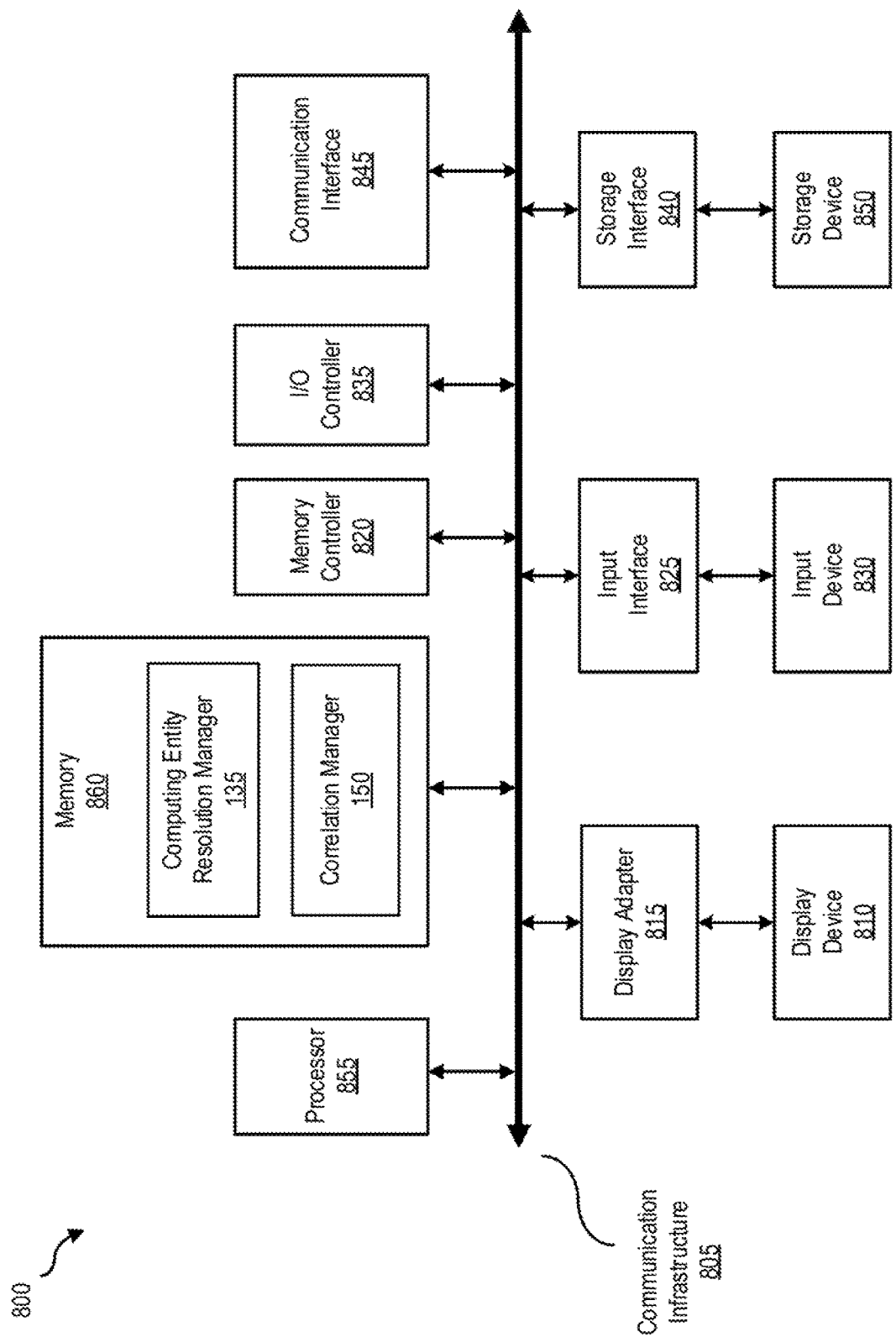
FIG. 8 is a block diagram 800 of a computing system, illustrating how a computing entity resolution manager and/or a correlation manager can be implemented in software, according to one embodiment of the present disclosure.

FIG. 8 is a block diagram 800 of a computing system, illustrating how a computing entity resolution manager and/or a correlation manager can be implemented in software, according to one embodiment. Computing system 800 can include NAC server 105 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes a computing entity resolution manager and/or a correlation manager, computing system 800 becomes a special purpose computing device that is configured to utilize computing entity resolution for network asset correlation.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing computing entity resolution manager and/or a correlation manager may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network.

Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Additionally or alternatively, one or more of the embodiments described and/or illustrated herein may be implemented in firmware and/or hardware.

Example Networking Environment

Figure 9:
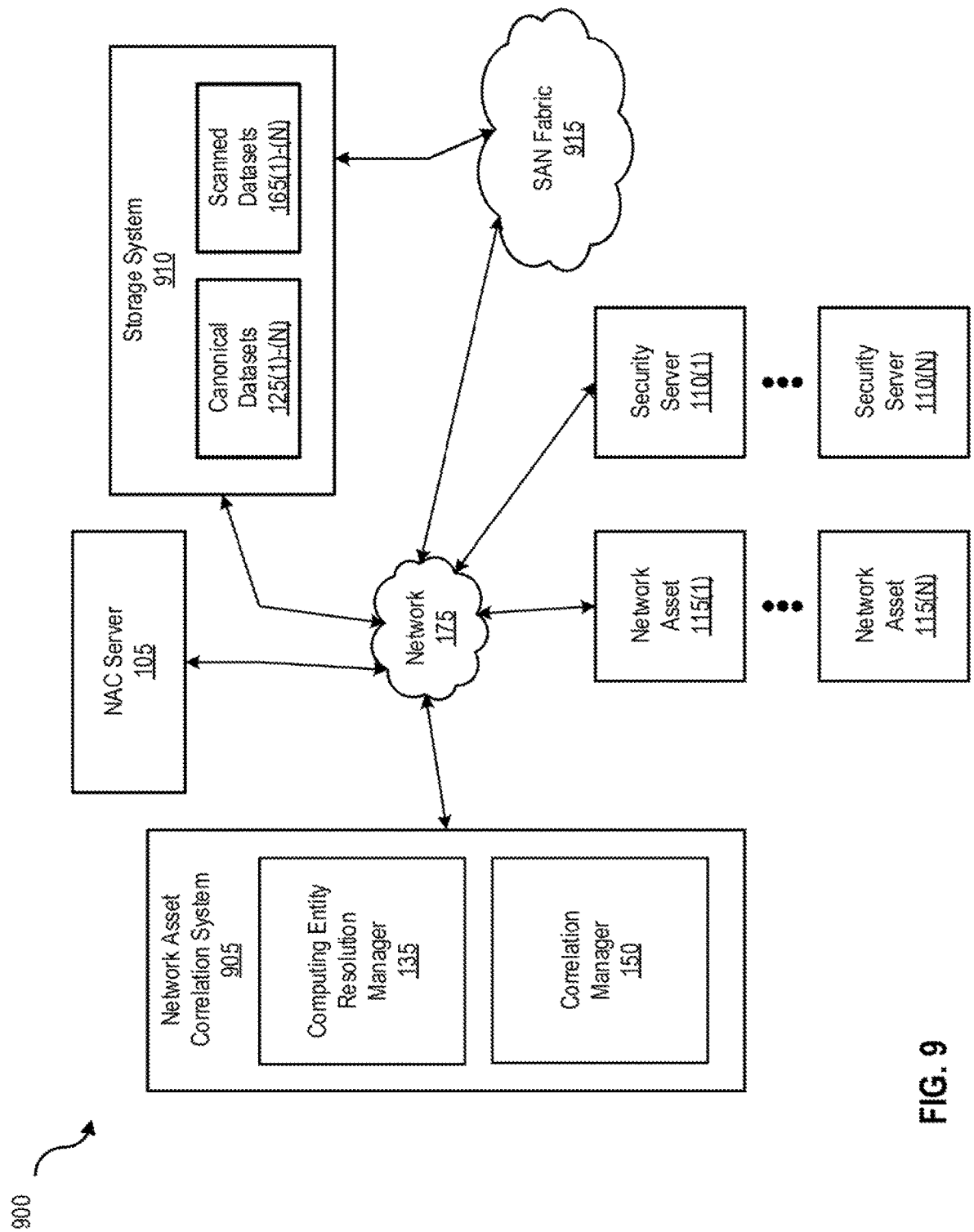
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 175 generally represents any type or form of computer network or architecture capable of facilitating communication between NAC server 105, network assets 115(1)-(N), security server 110, and/or network asset correlation system 905. For example, network 175 can be a Wide Area Network (WAN) (e.g., the Internet) or a Local Area Network (LAN).

In certain embodiments, a communication interface, such as communication interface 845 in FIG. 8, may be used to provide connectivity between NAC server 105, network assets 115(1)-(N), security server 110, and/or network asset correlation system 905, and network 175. The embodiments described and/or illustrated herein are not limited to the Internet or any particular network-based environment.

In some embodiments, network asset correlation system 905 may be part of NAC server 105, or may be separate. If separate, network asset correlation system 905 and NAC server 105 may be communicatively coupled via network 175. In one embodiment, all or a portion of one or more of the disclosed embodiments may be encoded as a computer program and loaded onto and executed by NAC server 105, network asset correlation system 905, security server 110, or any combination thereof, and may be stored on NAC server 105, network asset correlation system 905, and/or security server 110, and distributed over network 175.

In some examples, all or a portion of NAC server 105, network assets 115(1)-(N), network asset correlation system 905, and/or security servers 110(1)-(N) may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, computing entity resolution manager 135 and/or correlation manager 150 may transform the behavior of NAC server 105 and/or security servers 110(1)-(N) to utilize entity resolution for asset correlation.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
   receiving a scanned dataset from a security server, wherein
      the scanned dataset comprises newly scanned node information that identifies one or more newly scanned nodes in a network;
   extracting the newly scanned node information from the scanned dataset, wherein
      the newly scanned node information indicates that the one or more newly scanned nodes cannot be identified as being part of a plurality of existing computing devices in the network;
   processing the newly scanned node information with a network access correlator, wherein
      the processing results in a set of asset correlation results for the one or more newly scanned nodes;
   identifying an existing computing device of the plurality of computing devices based on a highest disparate correlation probability in the set of asset correlation results; and
   instructing the security server to perform a security action on the identified existing computing device.

2. The computer-implemented method of claim 1, wherein
   the network asset correlator probabilistically indicates a disparate correlation between each existing computing device of the plurality of existing computing devices and each of the one or more newly scanned nodes.

3. The computer-implemented method of claim 1, wherein
   the security action comprises, at least in part, determining, based on the highest disparate correlation probability, that the identified existing computing device should be over-provisioned with computing resources compared to at least one of the one or more newly scanned nodes.

4. The computer-implemented method of claim 1, wherein
   the security action comprises, at least in part, a vulnerability assessment.

5. The computer-implemented method of claim 1, wherein
   the security action comprises, at least in part, a decoy provisioning.

6. The computer-implemented method of claim 1, further comprising:
   identifying another existing computing device based on a disparate correlation probability in the set of asset correlation results exceeding an entity resolution threshold; and
   including the another existing computing in the security action.

7. A non-transitory computer readable storage medium comprising program instructions executable to:
   receive a scanned dataset from a security server, wherein
      the scanned dataset comprises newly scanned node information that identifies one or more newly scanned nodes in a network;
   extract the newly scanned node information from the scanned dataset, wherein
      the newly scanned node information indicates that the one or more newly scanned nodes cannot be identified as being part of a plurality of existing computing devices in the network;
   process the newly scanned node information with a network access correlator, wherein
      the processing results in a set of asset correlation results for the one or more newly scanned nodes;
   identify an existing computing device of the plurality of computing devices based on a highest disparate correlation probability in the set of asset correlation results; and
   instruct the security server to perform a security action on the identified existing computing device.

8. The non-transitory computer readable storage medium of claim 7, wherein the network asset correlator probabilistically indicates a disparate correlation between each existing computing device of the plurality of existing computing devices and each of the one or more newly scanned nodes.

9. The non-transitory computer readable storage medium of claim 7, wherein
the security action comprises, at least in part, determining, based on the highest disparate correlation probability, that the identified existing computing device should be over-provisioned with computing resources compared to at least one of the one or more newly scanned nodes.

10. The non-transitory computer readable storage medium of claim 7, wherein
the security action comprises, at least in part, a vulnerability assessment.

11. The non-transitory computer readable storage medium of claim 7, wherein
the security action comprises, at least in part, a decoy provisioning.

12. The non-transitory computer readable storage medium of claim 7, further comprising:
identifying another existing computing device based on a disparate correlation probability in the set of asset correlation results exceeding an entity resolution threshold; and
including the another existing computing in the security action.

13. A system comprising:
one or more processors; and
a memory coupled to the one or more processors, wherein the memory stores program instructions executable by the one or more processors to:
receive a scanned dataset from a security server, wherein the scanned dataset comprises newly scanned node information that identifies one or more newly scanned nodes in a network;
extract the newly scanned node information from the scanned dataset, wherein
the newly scanned node information indicates that the one or more newly scanned nodes cannot be identified as being part of a plurality of existing computing devices in the network;
process the newly scanned node information with a network access correlator, wherein
the processing results in a set of asset correlation results for the one or more newly scanned nodes;
identify an existing computing device of the plurality of computing devices based on a highest disparate correlation probability in the set of asset correlation results; and
instruct the security server to perform a security action on the identified existing computing device.

14. The system of claim 13, wherein
the network asset correlator probabilistically indicates a disparate correlation between each existing computing device of the plurality of existing computing devices and each of the one or more newly scanned nodes.

15. The system of claim 13, wherein
the security action comprises, at least in part, determining, based on the highest disparate correlation probability, that the identified existing computing device should be over-provisioned with computing resources compared to at least one of the one or more newly scanned nodes.

16. The system of claim 13, wherein
the security action comprises, at least in part, a vulnerability assessment.

17. The system of claim 13, wherein
the security action comprises, at least in part, a decoy provisioning.

18. The system of claim 13, further comprising:
identifying another existing computing device based on a disparate correlation probability in the set of asset correlation results exceeding an entity resolution threshold; and
including the another existing computing in the security action.

* * * * *